(12) United States Patent
Price et al.

(10) Patent No.: US 11,087,447 B2
(45) Date of Patent: *Aug. 10, 2021

(54) SYSTEMS AND METHODS FOR QUALITY ASSURANCE OF IMAGE RECOGNITION MODEL

(71) Applicant: Capital One Services, LLC, McLean, VA (US)

(72) Inventors: Micah Price, Plano, TX (US); Chi-San Ho, Allen, TX (US); Aamer Charania, Flower Mound, TX (US); Sunil Vasisht, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/411,808

(22) Filed: May 14, 2019

(65) Prior Publication Data

US 2020/0184623 A1 Jun. 11, 2020

Related U.S. Application Data

(63) Continuation of application No. 16/216,982, filed on Dec. 11, 2018, now Pat. No. 10,332,245.

(51) Int. Cl.
*G06T 7/00* (2017.01)
*G06T 3/60* (2006.01)
(Continued)

(52) U.S. Cl.
CPC .......... *G06T 7/0002* (2013.01); *G06K 9/6256* (2013.01); *G06K 9/6267* (2013.01);
(Continued)

(58) Field of Classification Search
CPC .. G06K 9/4628; G06K 9/6255; G06K 9/6256; G06K 9/6262; G06K 9/6267;
(Continued)

(56) References Cited

U.S. PATENT DOCUMENTS

| | | |
|---|---|---|
| 5,459,636 A | 10/1995 | Gee |
| 6,470,261 B1 | 10/2002 | Ng |
| 8,306,931 B1 | 11/2012 | Bowman |
| 10,140,553 B1 | 11/2018 | Vasisht |

(Continued)

*Primary Examiner* — Katrina R Fujita
(74) *Attorney, Agent, or Firm* — Finnegan, Henderson, Farabow, Garrett & Dunner, LLP

(57) ABSTRACT

Disclosed embodiments provide systems, methods, and computer-readable storage media for stress testing a vehicle identification model by determining image quality parameters optimizing model confidence values. The embodiments comprise one or more memory devices storing instructions and one or more processors configured to execute instructions. The one or more processors perform operations comprising receiving a first set of images of the vehicle, wherein the images contain preset values for parameters comprising at least one of a rotation, a focus, a contrast, and a color. The system further analyzes the first set of images with an identification model and determining an initial identification confidence of the vehicle. The system further modifies the first set of images, compares the modified images to the first set of images, and determines whether the model should be modified based on at least the comparison.

19 Claims, 12 Drawing Sheets

(51) Int. Cl.
*G06T 11/00* (2006.01)
*G06T 7/90* (2017.01)
*G06K 9/62* (2006.01)
*G06N 3/02* (2006.01)
*G06N 3/08* (2006.01)
*G06N 5/00* (2006.01)
*G06N 20/20* (2019.01)
*G06N 3/04* (2006.01)
*G06N 20/00* (2019.01)

(52) U.S. Cl.
CPC ............. *G06N 3/02* (2013.01); *G06N 3/0454* (2013.01); *G06N 3/084* (2013.01); *G06N 5/003* (2013.01); *G06N 20/20* (2019.01); *G06T 3/60* (2013.01); *G06T 7/90* (2017.01); *G06T 7/97* (2017.01); *G06T 11/001* (2013.01); *G06N 20/00* (2019.01); *G06T 2207/30168* (2013.01)

(58) Field of Classification Search
CPC .... G06K 2209/23; G06N 3/02; G06N 3/0454; G06N 3/084; G06N 5/003; G06N 20/00; G06N 20/20; G06T 3/60; G06T 7/0002; G06T 7/90; G06T 7/97; G06T 11/001; G06T 2207/30168
See application file for complete search history.

(56) References Cited

U.S. PATENT DOCUMENTS

| | | | |
|---|---|---|---|
| 10,192,173 | B2 | 1/2019 | Stephens |
| 10,430,708 | B1* | 10/2019 | Hu .................. G06T 11/008 |
| 2005/0030387 | A1* | 2/2005 | Pilu .................. H04N 5/23225 348/211.99 |
| 2006/0224533 | A1* | 10/2006 | Thaler .................. G06N 3/0454 706/15 |
| 2009/0290757 | A1 | 11/2009 | Mian |
| 2010/0211536 | A1* | 8/2010 | Al-Fattah ............... E21B 49/00 706/21 |
| 2013/0034263 | A1* | 2/2013 | Ding ..................... G06K 9/624 382/103 |
| 2013/0132311 | A1 | 5/2013 | Liu |
| 2013/0325776 | A1 | 12/2013 | Ponulak |
| 2015/0106310 | A1 | 4/2015 | Birdwell |
| 2016/0259994 | A1 | 9/2016 | Ravindran |
| 2017/0200092 | A1* | 7/2017 | Kisilev ................ G06N 20/00 |
| 2017/0286828 | A1* | 10/2017 | Smith .................. G06N 3/049 |
| 2017/0357896 | A1 | 12/2017 | Tsatsin |
| 2018/0253866 | A1* | 9/2018 | Jain ...................... G06N 7/005 |
| 2019/0073560 | A1* | 3/2019 | Matei .................. G06K 9/4628 |
| 2019/0156202 | A1* | 5/2019 | Falk ..................... G06N 3/0454 |
| 2019/0228267 | A1* | 7/2019 | Singh .................. G06K 9/6262 |
| 2019/0297326 | A1* | 9/2019 | Reda ..................... G06T 5/20 |
| 2019/0325259 | A1* | 10/2019 | Murphy ............... G06K 9/6259 |
| 2019/0340949 | A1* | 11/2019 | Meisner ................ G06F 40/30 |
| 2019/0370687 | A1* | 12/2019 | Pezzillo ............... G06N 20/00 |

* cited by examiner

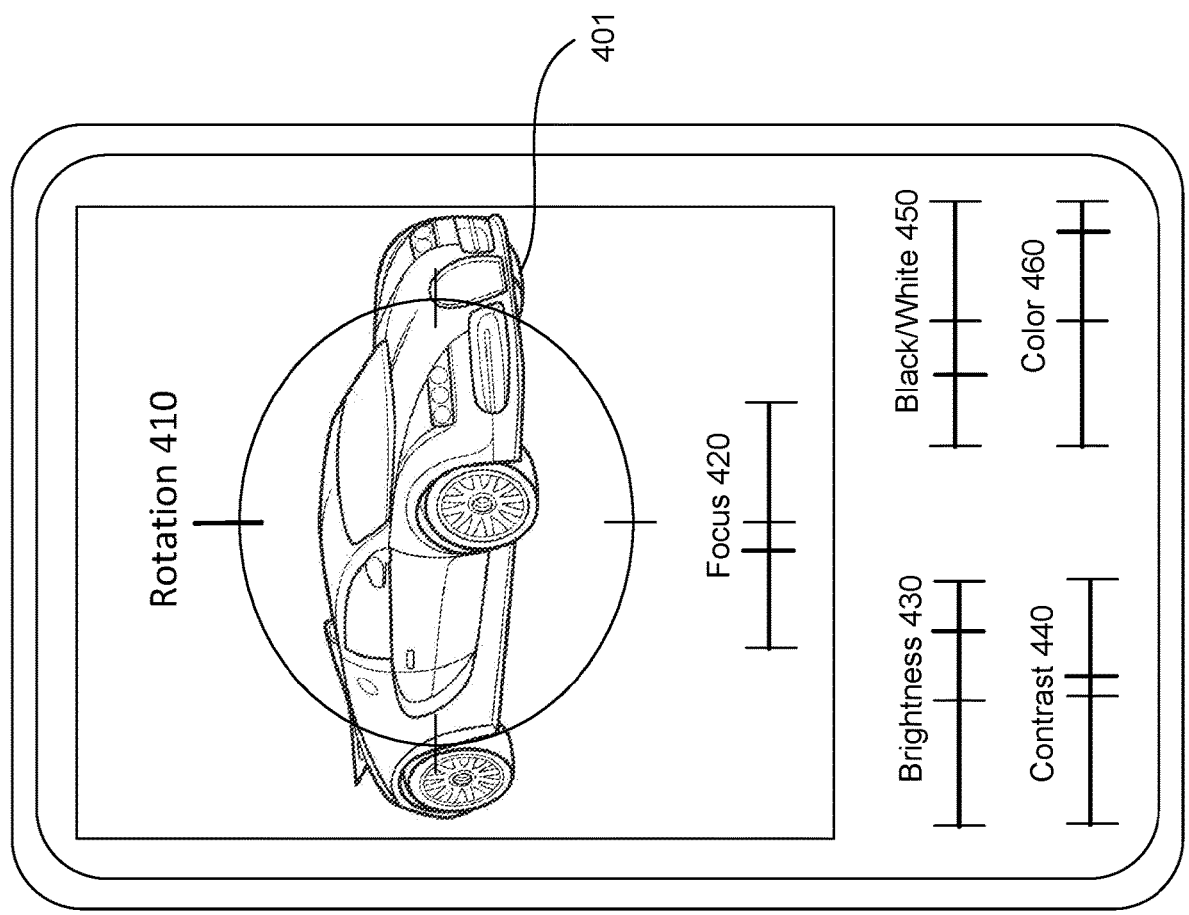

SYSTEMS AND METHODS FOR QUALITY ASSURANCE OF IMAGE RECOGNITION MODEL

This application is a continuation of U.S. patent application Ser. No. 16/216,982, filed Dec. 11, 2018, the entire contents of which are hereby incorporated by reference in their entireties.

TECHNICAL FIELD

The present disclosure relates generally to the field of image analysis using machine learning processes. More specifically, and without limitation, this disclosure relates to systems and methods for using machine learning processes to identify vehicles from images. More specifically, and without limitation, this disclosure relates to systems and methods for improving object recognition by stress testing a vehicle identification model using processed images and determining the effect of image attribute modifications on vehicle identification.

BACKGROUND

Extant image recognition systems, such as classifiers, cascading classifiers, neural networks, convolutional neural networks, or the like are used to receive an image of an object and determine the identity of the object. These systems may achieve high accuracy (e.g., comparable to humans) when the received image contains high-quality attribute and pixel data. However, the accuracy of extant systems is decreased when low-quality images are used. This is due, in part, to conflicting classifications when different objects (such as a vehicle and a person, a kitten and a ball, or the like) are present within the image, and more importantly, a recognition system is unable to determine the differences in objects because of the quality of image attribute data.

In particular, such systems, which often comprise neural networks or convolutional neural networks, may detect a plurality of objects within an image, recognize classes of objects within the image, and assign several potential identifications of the classes based on confidence scores. However, such processes usually generate many (e.g., on the order of 1000 or more) identified classes, and a few adjustments to attributes of the image may significantly alter an identified class distribution of the process.

One solution for improving image recognition or object detection is "stress testing" such systems, that is, determining the impact of several attribute adjustments in a controlled manner by isolating a single attribute for a received and identified image, repeatedly adjusting the attribute from minor to extreme modifications, determining the recognition confidence (e.g. the object identification) for each adjustment, and repeating this process for each tested attribute. By doing so, it may be possible to build a baseline relating to image quality and attribute data. The data from stress testing may be used to create distribution and statistical analysis to further understand whether minor, or extreme, modifications improve the recognition systems so that image quality may be properly mitigated in future image object identification.

The present disclosure provides systems, methods, and devices to further improve the accuracy of such object recognition processes by stress testing image recognition models using modified images. By building a baseline and quality control parameters, the identification process is further able to account for image quality by modifying image attributes, such as rotation, focus, brightness, contrast, black/white, and color.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a car detection mobile application, the disclosed embodiments are not limited to any particular industry.

Disclosed embodiments provide systems, methods, and computer-readable storage media for stress testing a vehicle identification model. The embodiments comprise one or more memory devices storing instructions and one or more processors configured to execute instructions. The one or more processors perform operations comprising receiving a first set of images of the vehicle, wherein the images contain preset values for parameters comprising at least one of a rotation, a focus, a contrast, and a color. The system further analyzes the first set of images with an identification model and determining an initial identification confidence of the vehicle. The system further modifies the first set of images, compares the modified images to the first set of images, and determines whether the model should be modified based on at least the comparison.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 4 illustrates an interface of an identification model application, consistent with disclosed embodiments.

DETAILED DESCRIPTION

Figure 1:
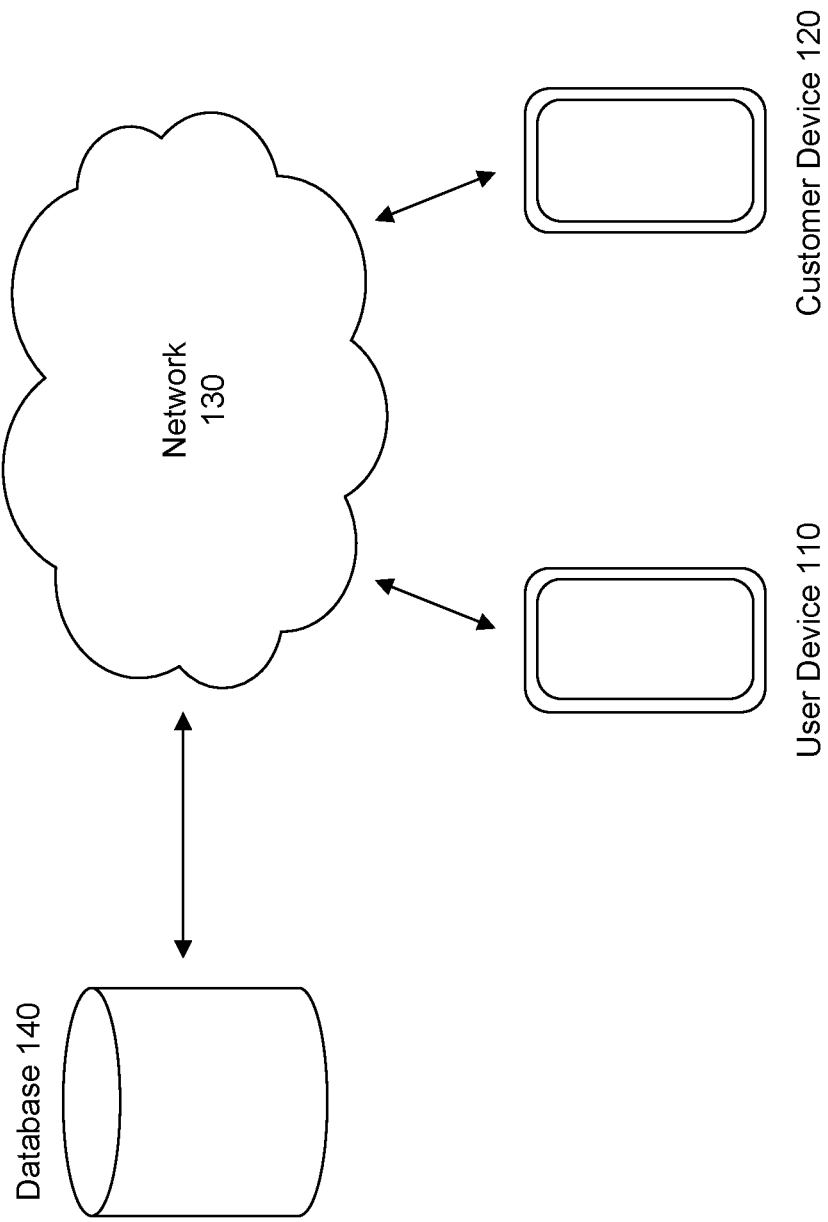
FIG. 1 is a block diagram illustrating an exemplary system for stress testing an identification model.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The disclosed embodiments relate to systems, devices, and methods for processing an image for object recognition, in particular stress testing a vehicle identification model by modifying images of the vehicle. Embodiments of the present disclosure may be implemented using at least one processor and at least one memory, as described below. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively or concurrently, the at least one processor may comprise one or more special-purpose devices built according to embodiments of the present disclosure using suitable circuit elements, e.g., one or more application-specific integrated circuits (ASICs), field-programmable gate arrays (FPGAs), or the like. In some embodiments, the at least one memory may comprise a volatile memory, such as random access memory (RAM), a non-volatile memory, such as a hard disk drive, a flash memory, or the like, or any combination thereof.

As used herein, the term "image" refers to any digital representation of a scene formed by one or more light beams. The image may comprise a plurality of pixels, each pixel having corresponding color and/or intensity data (e.g., RGB, CMYK, or grayscale data). The image may be stored in any appropriate format, such as bitmap (BMP) format, Joint Photographic Experts Group (JPEG) format, Graphics Interchange Format (GIF), Tagged Image File Format (TIFF), a raw format, or the like. The at least one processor may receive the image from a memory, e.g., via one or more buses, over a computer network, e.g., by using a network interface controller (NIC), from an image sensor, e.g., a charge-coupled device (CCD), a complementary metal-oxide-semiconductor (CMOS), an N-type metal-oxide-semiconductor logic (NMOS), or the like.

An image may further have associated "attributes." The attributes may be associated with an object itself or the attributes may be associated with the image. Image-attributes may include inherent measurable features based on pixel data (e.g., RGB, CMYK, grayscale, brightness, contrast, histogram, noise reducing, etc.), and image-attributes may also include recorded operations performed on the image (e.g., sectioning, layering, image scaling, cropping, cutting, orientating, perspective controlling, distorting, lens correcting, enhancing, sharpening and softening, merging, slicing, special effecting, stamping, gamma correcting, dynamic blending, warping, exposing, etc.). When the object is a vehicle, the object-attributes may be associated with a vehicle make, model, trim line, year, color, etc.

The at least one processor may be further configured to run an identification model by detecting and recognizing objects (e.g. vehicles, trees, cats, dogs, humans, etc.) in received images. For a given object (i.e. vehicle), the identification model may further recognize a subgroup of classes (e.g. Honda Civics, Toyota Camrys, etc.). In some aspects, identification models may include convolutional neural networks that detect objects and determine attributes in an image based on features extracted from the image. The convolutional neural network (CNN) may comprise, for example, a You Only Look Once (YOLO) architecture, a Single-Shot Detector (SSD) architecture, or the like, as well as architectures designed for image recognition like Inception, VGG, ResNet, or the like.

In various aspects, identification models may include statistical processes to determine confidence scores. After training an identification model to certain objects (i.e. cats, dogs, or vehicle) with a set of training images, the model may output class identification conclusions based on assigned confidence scores. For example, after training to cats, the model may analyze a picture of a cat and determine three likely recognized classes based on image attribute analysis and determined confidence scores (i.e. 90% Siamese cat, 6% British Shorthair cat, or 4% Norwegian Forest cat). These statistical processes may further determine a similarity between images. For example, identification models may include regression models that estimate the relationships among input and output variables. In some aspects, identification models may additionally sort elements of a dataset using one or more classifiers to determine the probability of a specific outcome. Statistical identification models may be parametric, non-parametric, and/or semi-parametric models.

A convolutional neural network model can be configured to process an image into a collection of features. The convolutional neural network can comprise an input layer, one or more middle layers, and one or more output layers. An image can be applied to the input layer. In some embodiments, the input layer can comprise multiple matrices (e.g., a matrix for each of the red, green, and blue pixel values in an RGB image). In some embodiments, the input layer can comprise a single matrix (e.g., a single two-dimensional matrix of pixel brightness values). In some aspects, each middle layer and the output layer can be a deterministic function of the values of the preceding layer. The convolutional neural network can include one or more convolutional layers. Each convolutional layer can be configured to convolve one or more spatial filters with the convolutional layer input to generate a convolutional layer output tensor. Each spatial filter function can be defined by a matrix of weights to be applied to each element of the preceding layer during a convolution operation, an offset, and an activation function. Training the convolutional neural network can comprise modifying the weights and offsets using a backpropagation algorithm. In some embodiments, the convolutional neural network can also include pooling layers and fully connected layers according to methods known in the art.

Identification models may also include Random Forests, composed of a combination of decision tree predictors. Such decision trees may comprise a data structure mapping observations about something, in the "branch" of the tree, to conclusions about that thing's target value, in the "leaves" of the tree. Each tree may depend on the values of a random vector sampled independently and with the same distribution for all trees in the forest. Identification models may additionally or alternatively include classification and regression trees, or other types of models known to those skilled in the art.

Additionally, or alternatively, the identification model may detect a plurality of objects, polygons, or other image segmentation within a received image. The identification model may calculate a class confidence score for an object based on a classification and a confidence associated with the object. The identification model may further identify the object by comparing the confidence score against other calculated confidence scores and other data stored in databases.

The identification models may also be stress-tested to determine the limits of the outputted statistical confidence scores. To stress-test an identification model, both image-and-vehicle attributes may be adjusted to determine the effects of modifications to isolated attributes on the resulting identification confidence scores. For instance, the effect of vehicle-attributes may be stress-tested for a series of images of the same vehicle make, model, trim line, and year, but with various colors. The resulting distribution of confidence scores may change based on the various colors tested. Similarly, the effect of image-attributes may be stress-tested for a single image of a vehicle, by modifying a single image-attribute, i.e. rotation, and determining the resulting confidence scores for the series of rotation modified images.

The at least one processor may be further configured to run an augmented reality framework, such as Apple's ARKit or Android's ARCore, or a machine learning framework, such as Apple's CoreML or Android's Tensorflow.

Systems and methods consistent with the present disclosure are directed to stress testing confidence values of a model for understanding conditions that may cause a model to fail, the insight to which may be used to improve the performance of an identification model. In particular, image attribute data of a set of images is adjusted in a controlled manner to determine the effects on accuracy of the identification model of isolated individual attributes on an entire set of images. By determining the effect of an isolated image attribute, e.g., rotation, the identification model may be further improved by determining control "parameters" accounting for confidence level distributions of image sets based on image attribute modifications. The parameters define a group of statistical values, based on stress testing, indicating ideal attribute modifications. For instance, using the stress test parameters, the model may determine image attribute adjustments likely to improve the confidence level of low-quality images.

FIG. 1 is a block diagram illustrating an exemplary system 100 for stress testing an identification model. System 100 may be used to identify a vehicle, and associated vehicle attributes (e.g., make, vehicle model, trim line, year, color, etc.) based on an image of the vehicle and associated image attributes (e.g., RGB, CMYK, grayscale, brightness, contrast, focus, rotation, etc.), consistent with disclosed embodiments. System 100 may be further used to modify the image attributes to improve the vehicle identification. System 100 may include a user device 110, a customer device 120, a network 130, and a database 140. In some embodiments, as shown in FIG. 1, each component of system 100 may be connected to a network 130. However, in other embodiments components of system 100 may be connected directly with each other, without network 170.

User device 110 may include one or more computing devices configured to perform operations consistent with disclosed embodiments. For example, user device 110 may include at least one of a desktop computer, a laptop, a server, a mobile device (e.g., tablet, smart phone, etc.), a gaming device, a wearable computing device, or other type of computing device. User device 110 may include one or more processors configured to execute software stored as instructions in memory. User device 110 may implement software to perform Internet-related communication and content display processes. For instance, user device 110 may execute browser software that generates and displays interfaces, including content, on a display device included in, or connected to, user device 110. User device 110 may execute applications that allow user device 110 to communicate with components over network 130, and generate and display content in interfaces via a display device included in user device 110. The disclosed embodiments are not limited to any particular configuration of user device 110. For instance, user device 110 can be a mobile device that stores and executes mobile applications that interact with network 130 and database 140 to perform aspects of the disclosed embodiments, such as identifying vehicles. In certain embodiments, user device 110 may be configured to execute software instructions relating to location services, such as GPS locations. For example, user device 110 may be configured to determine a geographic location and provide location data and time stamp data corresponding to the location data. In yet other embodiments, user device 110 may capture video and/or images.

Customer device 120 may also include one or more computing devices configured to perform operations consistent with disclosed embodiments. Customer device 120 may have the same functions and features as user device 110. Customer device 120 is further associated with a third party customer. For instance, in some embodiments, user device 110 may be utilized to conduct the stress testing methods and systems described herein, whereas, customer device 120 may only be used to acquire images and identify objects therein.

Network 130 may be any type of network configured to provide communications between components of system 100. For example, network 130 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 130. In various embodiments, one or more components of system 100 may communicate directly through one or more dedicated communication links.

Database 140 may include one or more computing devices configured to provide vehicle data to one or more of user device 110 or customer device 120. In some aspects, such vehicle data can include vehicle inventory listings, vehicle images, and vehicle features. Database 140 may include, for example, one or more Oracle™ databases, Sybase™ databases, or other relational databases or non-relational databases, such as Hadoop™ sequence files, HBase™, or Cassandra™. Database(s) 140 may include computing components (e.g., database management system, database server, etc.) configured to receive and process requests for data stored in memory devices of the database(s) and to provide data from the database(s).

While database 140 is shown separately, in some embodiments database 140 may be included in or otherwise related to one or more of user device 110 and/or customer device 120.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
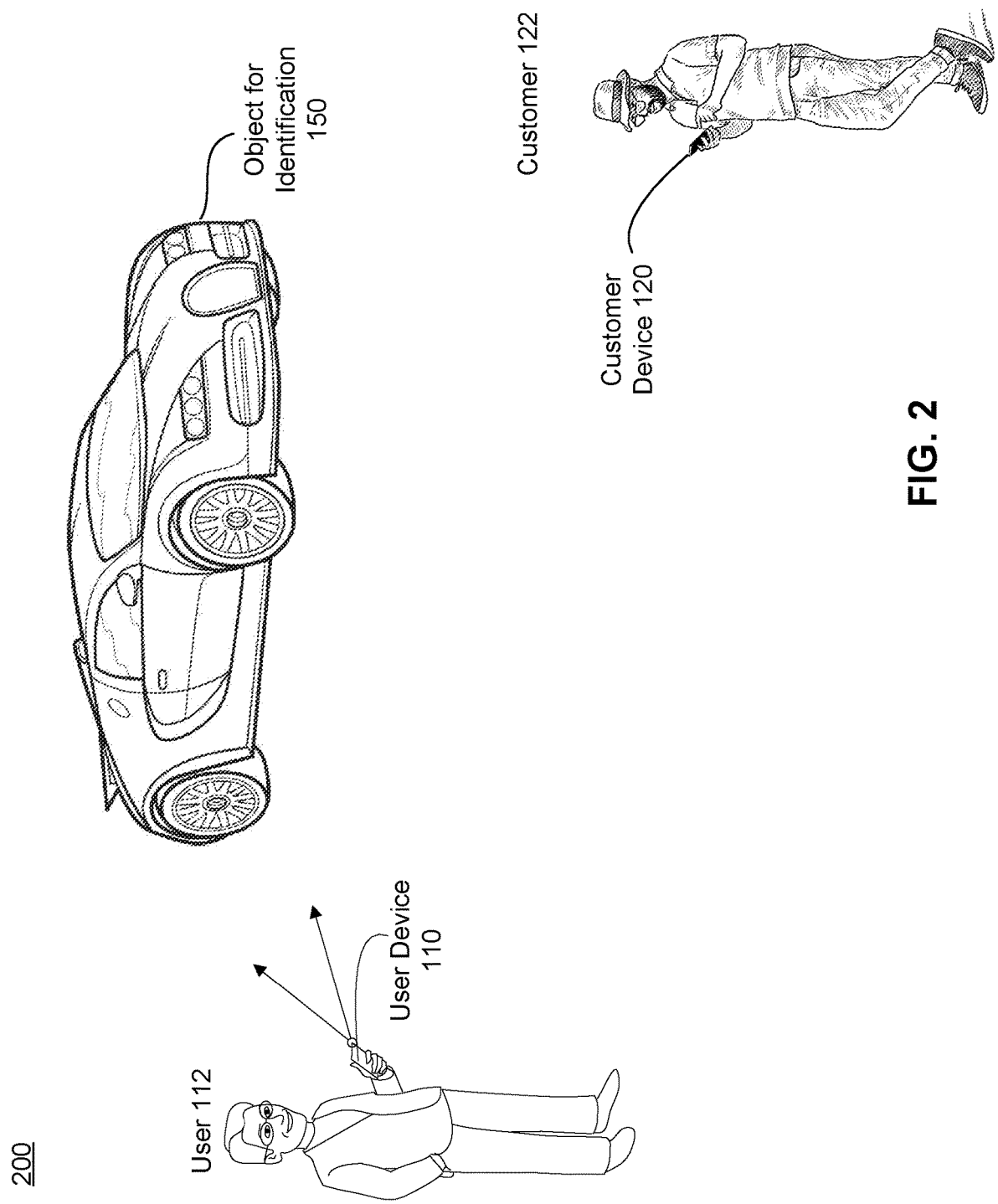
FIG. 2 is a diagram illustrating use of the system of FIG. 1, consistent with the disclosed embodiments.

FIG. 2 shows an environment 200 illustrating use of system 100 consistent with the disclosed embodiments. User device 110 and customer device 120 are consistent with the functions and properties described throughout FIG. 1. A user 112 is an individual, or group of individuals, who test the identification model application that performs the functions described herein for identifying objects (e.g., vehicles) based on received images. Further, in some embodiments user 112 may use user device 110, installed with an identification model application, to modify and adjust the received images to stress-test the identification model application consistent with the methods described herein, and in particular FIGS. 7-8.

After user 112 completes stress-testing the identification model application (described in detail with respect to FIGS. 7-8), in some embodiments, a customer 122 may utilize customer device 120, also installed with an identification model application, to identify an object of interest 150. In some embodiments, customer 122 may have a version of an identification model application different from the identification model application installed on user device 110, such that customer 122 is unable to modify the model itself. In other embodiments, user 112 may have a version of an identification model application such that user 112 may modify the model on user device 110.

Object 150 is an object to be identified and recognized by an identification model application. User 112 may utilize user device 110 to capture images of object 150, feed those images to the identification model application through the means described herein. The identification model may assign confidence index values to potential objects, and conclude the identity of object 150 based on the highest assigned confidence index value. In some embodiments, object 150 may be a vehicle, such as an automobile, vehicle, motorcycle, moped, bicycle, tricycle, etc., or alternatively, object 150 may be any object such as a tree, a building, or an animal.

Figure 3:
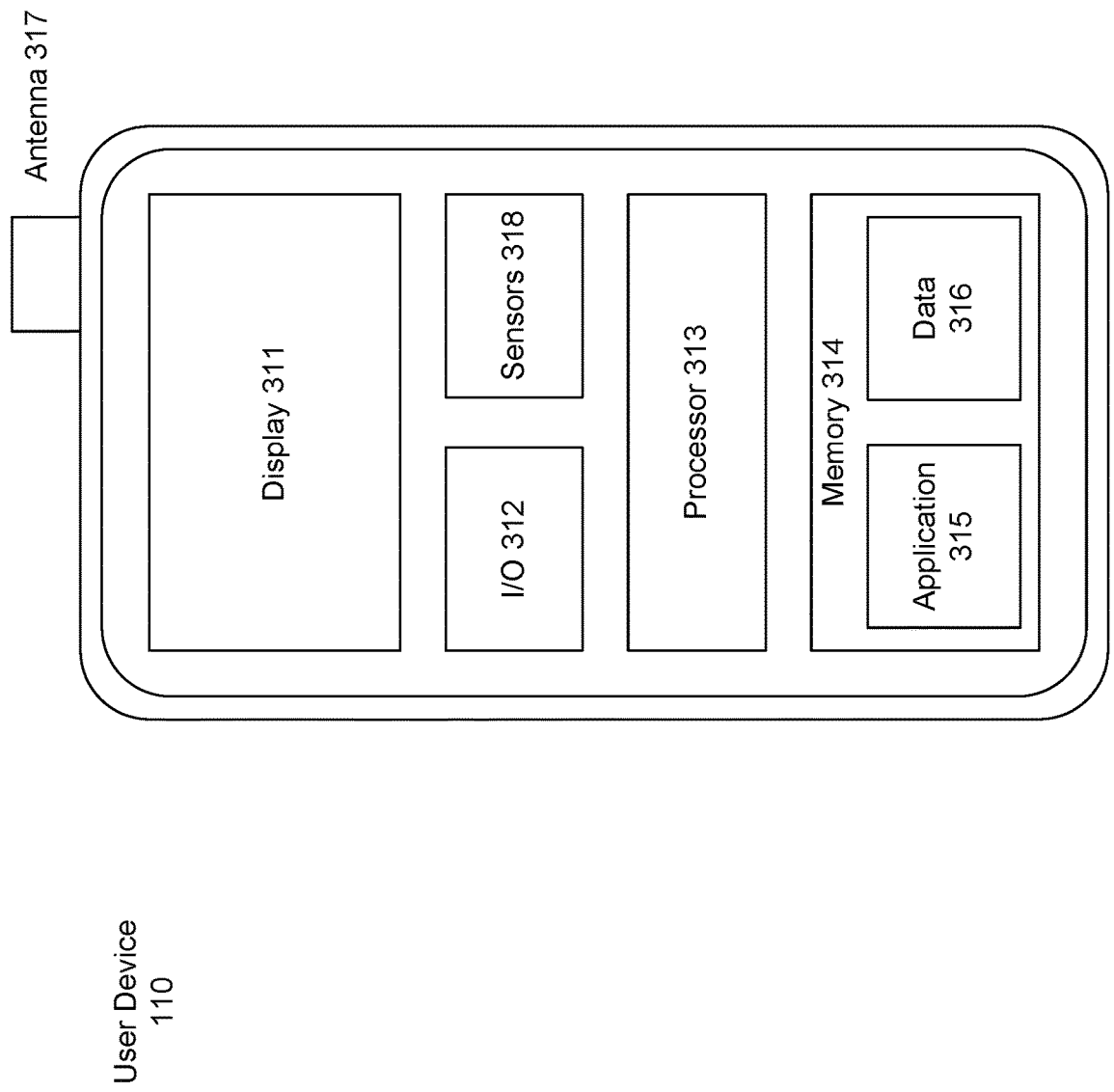
FIG. 3 is a block diagram an exemplary user device, consistent with disclosed embodiments.

FIG. 3 illustrates an exemplary configuration of user device 110, consistent with disclosed embodiments. User device 110 may be implemented in system 100 as various devices, such as a cell phone, a tablet, a mobile computer, a desktop, etc. As shown, user device 110 includes a display 311, one or more input/output ("I/O") components 312, one or more processors 313, and a memory 314 having stored therein one or more program applications 315, such as an identification model application, and data 316. User device 110 also includes an antenna 317 and one or more sensors 318.

Processor 313 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 313 may constitute a single-core or multiple-core processors that execute parallel processes simultaneously. For example, processor 313 may be a single-core processor configured with virtual processing technologies. In certain embodiments, processor 313 may use logical processors to simultaneously execute and control multiple processes. Processor 313 may implement virtual machine technologies, or other known technologies to provide the ability to execute, control, run, manipulate, store, etc., multiple software processes, applications, programs, etc. In another embodiment, processor 313 may include a multiple-core processor arrangement (e.g., dual, quad core, etc.) configured to provide parallel processing functionalities to allow user device 110 to execute multiple processes simultaneously. One of ordinary skill in the art would understand that other types of processor arrangements could be employed that provide for the capabilities disclosed herein.

I/O devices 312 may include one or more I/O components 312 that allow user device 110 to receive input from a user and provide feedback to the user. I/O components 312 may include components such as, for example, buttons, switches, speakers, microphones, cameras, styluses, or touchscreen panels.

Memory 314 may be a volatile or non-volatile, magnetic, semiconductor, tape, optical, removable, non-removable, or other type of storage device or tangible (i.e., non-transitory) computer-readable medium that stores one or more program applications 315 and data 316. Data 316 may include, for example, display settings and preferences, vehicle attributes (e.g., make, vehicle model, trim, year, color, etc.), and image attributes (e.g., RGB, CMYK, grayscale, brightness, contrast, focus, rotation, etc.).

Program applications 315 may include operating systems that perform known operating system functions when executed by one or more processors. By way of example, the operating systems may include Microsoft Windows™, Unix™, Linux™, Apple™, or Android™ operating systems, Personal Digital Assistant (PDA) type operating systems, such as Microsoft CE™, or other types of operating systems. Accordingly, disclosed embodiments may operate and function with computer systems running any type of operating system. User device 110 may also include communication software that, when executed by processor 313, provides communications with network 130, such as Web browser software, tablet, or smart hand held device networking software, etc.

Program application 315 may include an identification model application that performs the functions described herein for identifying vehicles based on received images. Identification model recognizes features in received images portraying an object and utilizes statistical analysis to determine an accurate identification of the object through assignment of confidence index values. The identification model may determine the object is likely to be a set of objects within a larger group such that multiple objects are assigned confidence index values. And the identification model may conclude a likely identity of an object based on the highest assigned confidence index value. The recognized features may be object attributes, and the image attributes may affect the accuracy and confidence index value determinations. In some embodiments, a user may compare the identification of a received image against known data in a database. The identification model application may incorporate several of the computation and convolutional computing processes discussed throughout here. In some embodiments, program application 315 may include a stress-testing application that performs the functions described in FIGS. 4-8.

User device 110 may also store in memory 314 data 316 relevant to the examples described herein for system 100, such images provided to user device 110. Data 316 may contain any data discussed above relating to the identification of objects in the received images. Data 316 may be further associated with information for a particular user or particular user device.

Sensors 318 may include one or more components capable of sensing the environment around user device 110, and/or movement of user device 110, as well as data gathered by input/output 312. In some embodiments, sensors 318 may include, for example, an accelerometer, a shock sensor, a gyroscope, a position sensor, a microphone, a camera, an ambient light sensor, a temperature sensor, and/or a conductivity sensor. In addition, sensors 318 may include location-detecting components such as a Global Positioning System (GPS) sensor, a radio frequency triangulation system based on cellular or other such wireless communication, and/or other systems for determining the location of accessing device 110.

Antenna 317 may include one or more components capable of communicating with network 130. Examples include an antenna wirelessly communicating with network 130 via cellular or Wi-Fi protocols. Although communication between user device 110 and network 130 is shown as wireless communication, communication could also occur using wired communication via, for example, an Ethernet terminal (not shown).

In certain embodiments, device 110 may include a power supply, such as a battery (not shown), configured to provide electrical power to user device 110.

FIG. 4 illustrates an interface of an exemplary identification model application 400. As discussed above, in some embodiments, identification model application 400 may include convolutional neural networks that analyze received images to detect objects and determine attributes in an image based on features and attributes extracted from the image. The CNN may comprise, for example, a You Only Look Once (YOLO) architecture, a Single-Shot Detector (SSD) architecture, or the like, as well as, architectures designed for image recognition like Inception, VGG, ResNet, or the like. The analyzed image may comprise a plurality of pixels, each pixel storing corresponding image quality data attributes (e.g., rotation, focus, brightness/contrast color, RGB, CMYK, grayscale, etc. data), additionally the image may contain data not corresponding to quality such as location data, time of photo capture data, capturing device data, and cropped data from the image.

In some embodiments, identification model application 400 may receive an image 401 of an object to be identified. Image 401 may be captured from various devices discussed herein such as user device 110 or customer device 120. Alternatively, in some embodiments image 401 may be stored in a database such as database 140. Image 401 may be transmitted, from user device 110, customer device 120, database 140, etc. to another device that runs identification model application 400 such as a second user device 110 consistent with the features described in FIG. 3. Alternatively, identification model 400 may further limit the features discussed herein such that user device 110 is enabled with all features, such as the stress-testing functions, whereas, customer device 120 is not enabled with the stress-testing functions.

Identification model application 400 analyzes received images portraying objects (e.g., vehicles) and recognizes features in the received images. Identification model application 400 analyzes the recognized features to accurately identify the object by assigning confidence index values to a set of potential objects. The identification model 400 concludes the identity of the object based on the recognized features, which may be object attributes, and confidence index value statistical analysis.

Image 401 may exhibit image attributes such as rotation angle 410, focus 420, brightness 430, contrast 440, black/white (saturation) 450, and color 460, as well as, other attribute data described herein. For instance, one skilled in the art will understand that while FIG. 4 depicts several image attributes, image 401 may exhibit other attributes that may have measurable or recorded modifications such as sections, layers, image scale, cropping, cutting, histogram, noise reduction, orientation, perspective control, distortion, lens correction, enhancement, sharpening and softening, merging, slicing, special effects, stamps, gamma correction, dynamic blending, warping, exposure time, etc. Additionally, identification model application 400 may adjust the attributes of received image 401, to improve the accuracy of identification model (as discussed in FIGS. 6A-C). Alternatively, identification model application may adjust the received attributes of received image 401 to stress-test an identification model in accordance with FIGS. 7-8.

Image rotation attribute 410 pertains to an angular orientation of image 401, but one skilled in the art would appreciate that attributes of various other coordinates may be used to describe the orientation of image 401. Also, in some embodiments, rotation 410 may be adjusted with identification model application 400. For instance, image 401 may be adjusted so the orientation is rotated by 10° relative to horizontal, or "flipped" by adjusting rotation 410 by 180°.

Image focus attribute 420 describes image data pertaining to capturing of the image by a lens. For instance, various portions of image 401 may be in focus, while other portions are not. Focus attribute 420 may be adjusted to add clarity to image 401.

Image brightness attribute 430 pertains to pixel data reflecting the luminance of portions of image 401. For instance, images may be improved by adjusting brightness 430 to increase luminance of underexposed portions of image thereby brightening under-exposed shadows without affecting the rest of image 401.

Image contrast attribute 440 pertains to the difference between dark and bright pixels of image 401. Adjustment of brightness 430 adjusts the overall luminance level of image 401, whereas adjustment of contrast 440 adjusts the difference in luminance between various portions of image 401. Increasing brightness 430 will increase the luminance value every pixel in portions of image 401 brighter, while increasing contrast 440 makes the luminance of bright pixels higher and the luminance of dark pixels lower.

Image black/white attribute 450 pertains to adjusting the color intensity level of pixels of image 401, whereas, image color attribute 460 pertains to the hue of pixels of image 401. Adjusting black/white 450 and color 460 may adjust every pixel data of image 401.

As discussed herein, user 112 may use identification model application 400 to adjust the image attributes of image 401. By modifying each attribute 410-460, user 112 may modify image 401 and create a new image for identification analysis. Alternatively, in some embodiments, identification model application 400 may automatically adjust the image attributes of image 401 by modifying each attribute 410-460. The identification model application 400 may further compare resulting identification analyses, based on the modified attributes 410-460, as well as resulting distribution of confidence values with respect to the modified attributes.

Figure 5A:
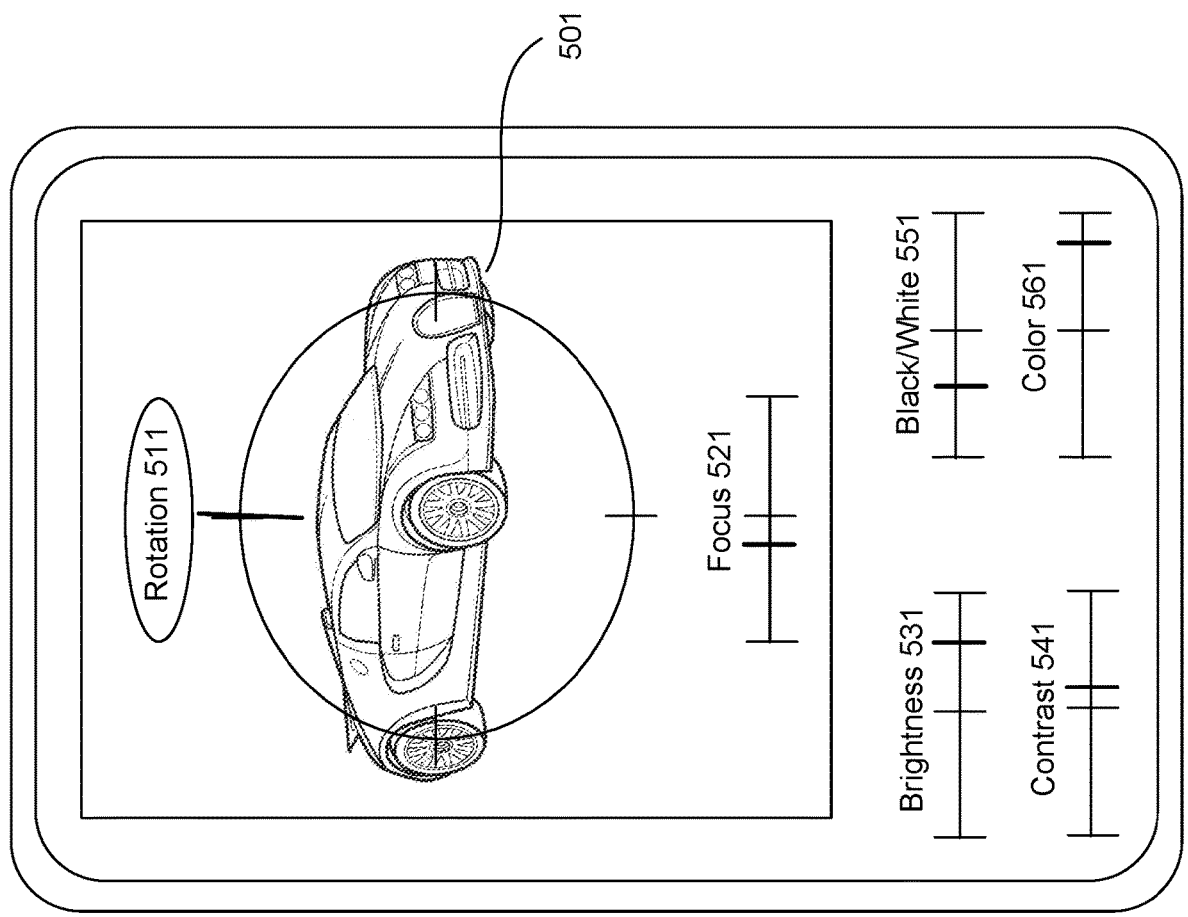
FIGS. 5A-C illustrate stress testing of the identification model application of FIG. 4.
Figure 5B:
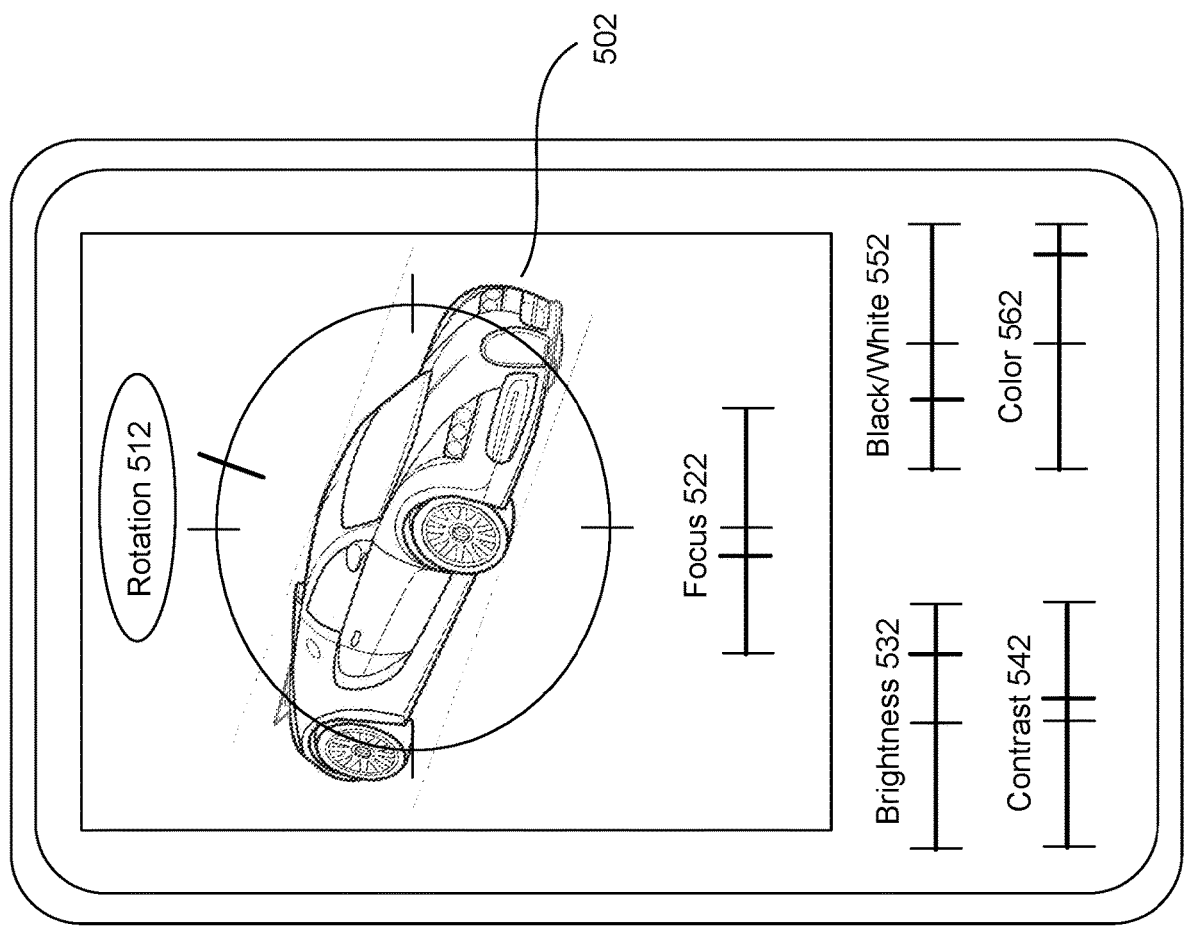
Figure 5C:
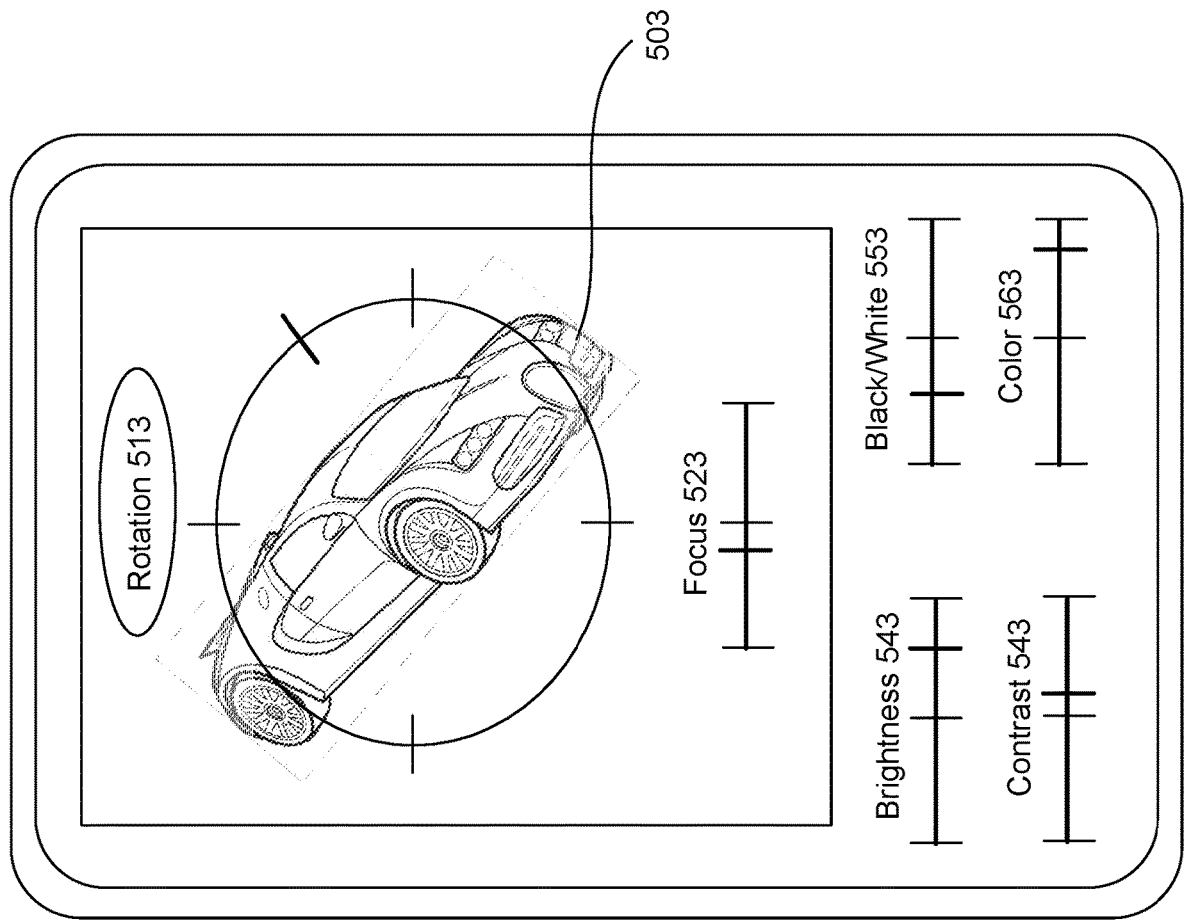

FIGS. 5A-C illustrate an example of stress testing of identification model application 400. In this example, a single attribute, the rotation image attribute, is adjusted and to test the identification results from the model for the same image at three different rotations (0°, 10°, and 50°). The identification model application determines the confidence of an appropriate identification for each image 501, 502, and 503 based on the rotation attribute modification through means described herein.

FIG. 5A shows image an image 501, which is identical to image 401, that is, with no modification. However, FIG. 5B shows an image 502, which is identical to image 401 except that a modification has been made in the form of a 10° rotation adjustment. Similarly, FIG. 5C shows an image 503, which is identical to image 401, except a modification has been made in the form of a 50° rotation adjustment. The remaining image attributes for focus (521, 522, and 523), brightness (531, 532, and 543), contrast (541, 542, and 543), black/white (551, 552, and 553), and color (561, 562, and 563) remain the same for images 501, 502, and 503.

The effect on the success of identification model application 400 is determined for each of the modifications of FIGS. 5A, 5B, and 5C. However, it will be understood by one skilled in the art that these three exemplary rotation modifications are not exclusive and the test will be more effective for numerous rotations, taking note of both rotation modifications that improve and rotation modifications that weaken the identification confidence. It is also understood that FIGS. 5A-C illustrate an isolated image attribute, but one skilled in the art will further understand that any or all of the attributes may be tested in a similar fashion. In some embodiments system 500 may further use these stress test results to recognize patterns in confidence level determinations for a given image attribute correction.

Figure 6A:
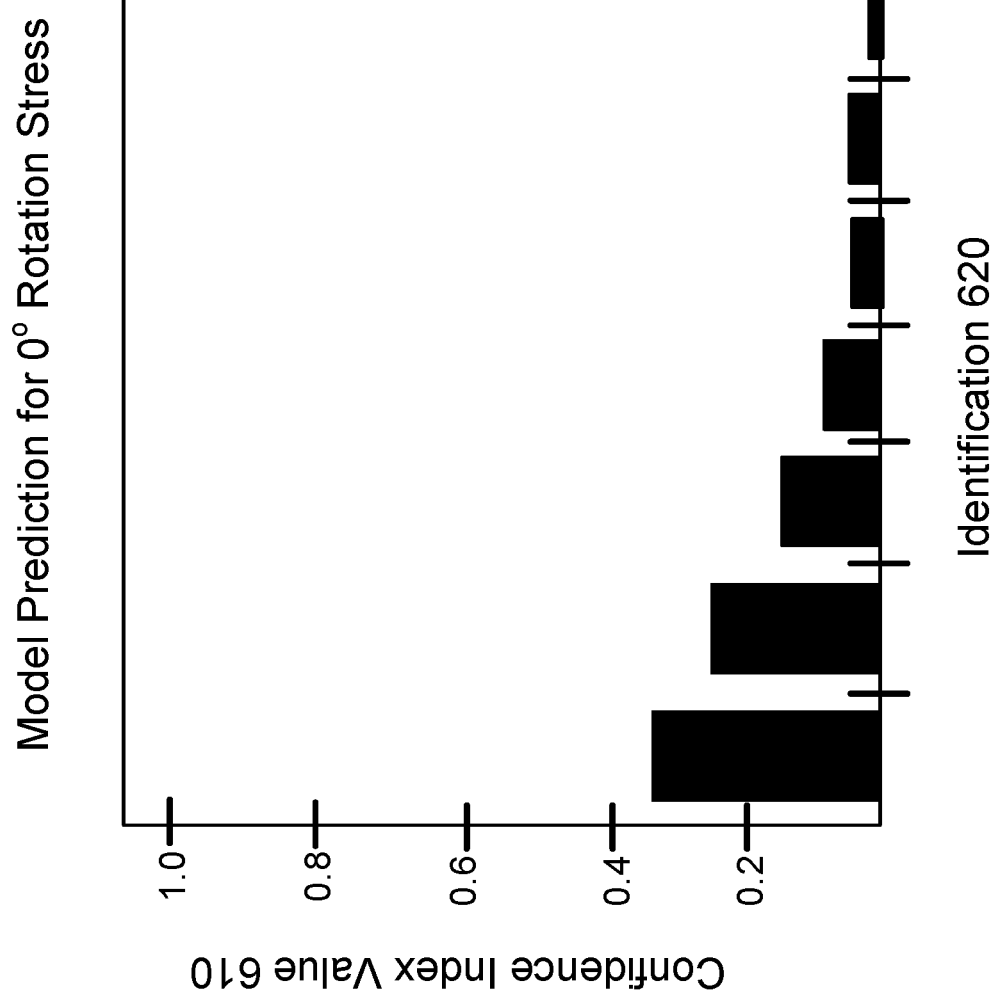
FIGS. 6A-C illustrate stress test effects on the identification model application of FIG. 4.
Figure 6B:
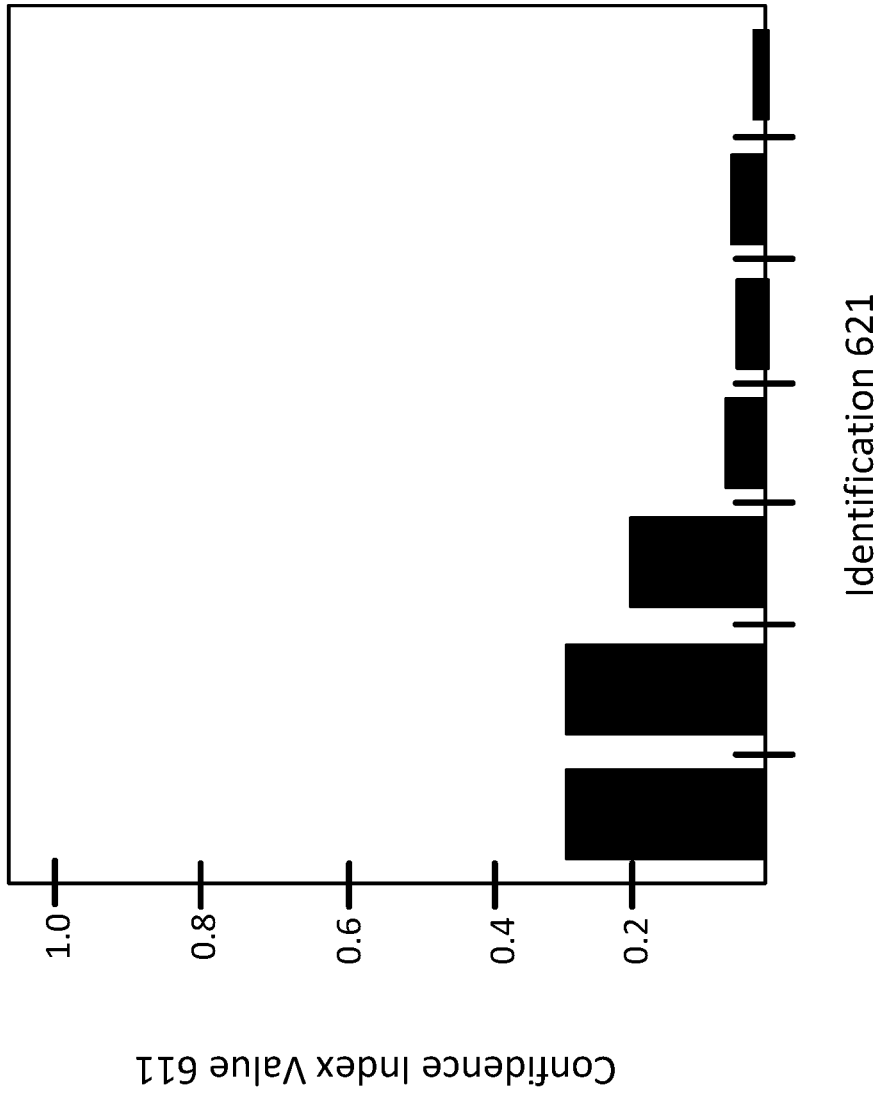
Figure 6C:
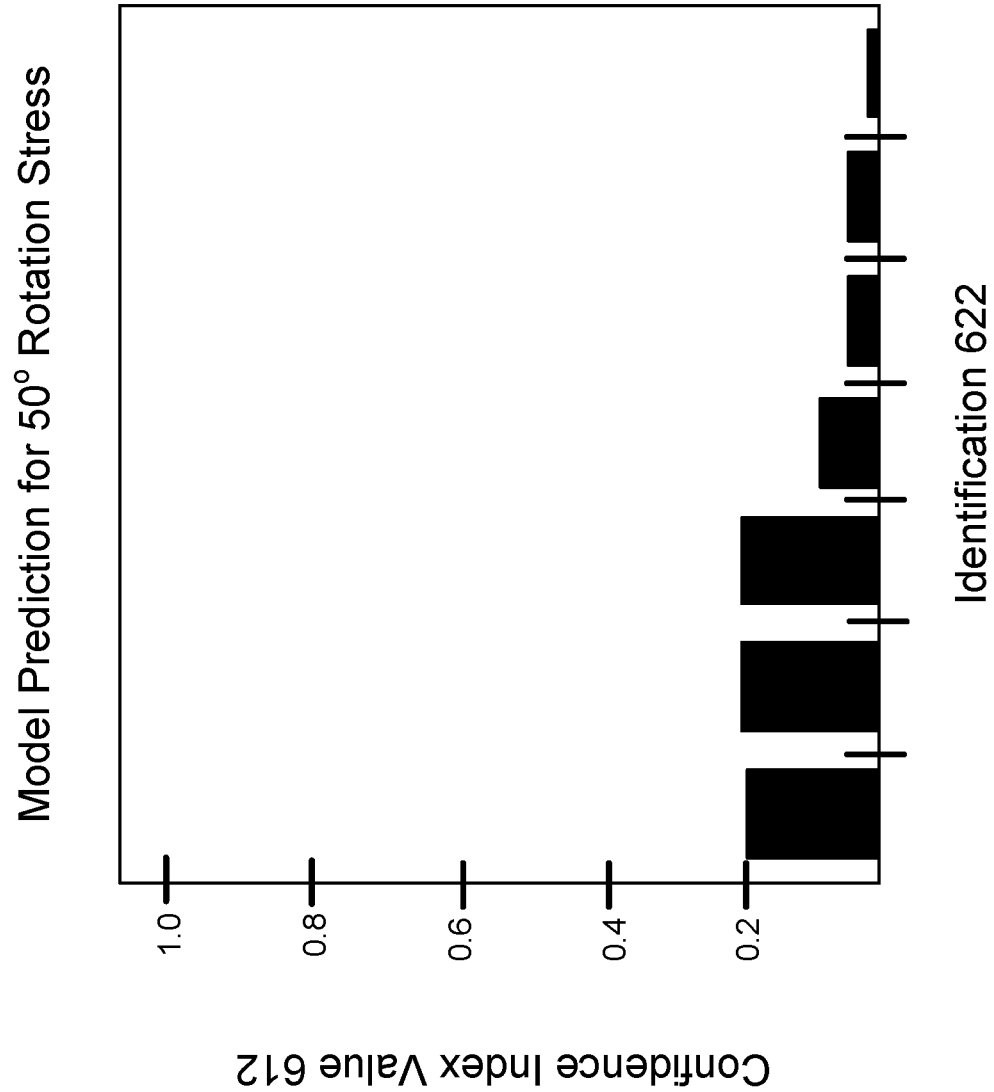

For example, FIGS. 6A-C illustrate one embodiment and the stress test effects on the identification model application. For the same stress test of FIGS. 5A-C (rotation adjustment of 0°, 10°, and 50°), FIGS. 6A-C illustrate the identification model confidence index values. In this embodiment, system 600 (like system 500) analyzes received image and adjusts just the rotation attribute.

FIGS. 6A-C show bar graphs with potential identified objects along the x-axis 620, 621, and 622 respectively, and associated determined confidence index values along the y-axis 610, 611, and 612 respectively. Each vertical bar represents the statistical confidence index value determination, as discussed herein, that the associated object (e.g., vehicle) is the correct object in the received image. Other than the rotation attribute modification from FIGS. 5A-C, the received images are the same. In some embodiments, the confidence index values may total 1.0. Additionally, in some embodiments, the potential identified objects may be significantly more than the shown seven or less than seven. Nevertheless, the first vertical bar in FIG. 6A is associated with the same object as the first vertical bar in FIGS. 6B-C, and so on with the remaining vertical bars respectively.

Like FIG. 5A, FIG. 6A has no modification to the rotation of received image 501. In FIG. 6A, the identification model application determines that the first vehicle identification 620 (the first vertical bar), is the correct identification with a confidence index value 610 of 0.35, the second vertical bar with a confidence index value of 0.30, the third vertical bar with a confidence index value of 0.15, and the fourth vertical bar with a confidence index value of 0.10. The fifth, sixth, and seventh vertical bars associated with the fifth, sixth, and seventh vehicle identification 620 total a confidence index value 610 of 0.1 and are nearly undistinguishable.

Like FIG. 5B, FIG. 6B has a slight rotation modification of 10° to the received image 502. And in FIG. 6A, the identification model application determines that the first vehicle identification 621 (the first vertical bar), is the correct identification with a confidence index value 611 of 0.30, the second vertical bar with a value of 0.30, and the third vertical bar with a value of 0.2. The remaining vehicle identifications 621 are undistinguishable.

Like FIG. 5C, FIG. 6C has a 500 rotation modification to the received image 503. And in FIG. 6C, the identification model application determines the first, second, and third vehicle identification 622 are undistinguishable but the most likely identification with confidence index values 612 of 0.2 respectively. The fourth vertical bar has a value of 0.1, and the remaining vehicle identification 622 are undistinguishable.

The system 600 stress test determines, in this embodiment, that as the rotation attribute is modified, the first identified vehicle, the first vertical bar 620, decreases in confidence from a confidence index value 610 of 0.35 in FIG. 6A to a value 612 of 0.2 in FIG. 6C. Additionally, in FIG. 6C. the identification model is less likely to distinguish between the top three identified vehicles. As a result, system 600 may further adjust the identification model application with these stress test results to further adjust the identification and confidence determination for future images with varying image attribute qualities.

Figure 7:
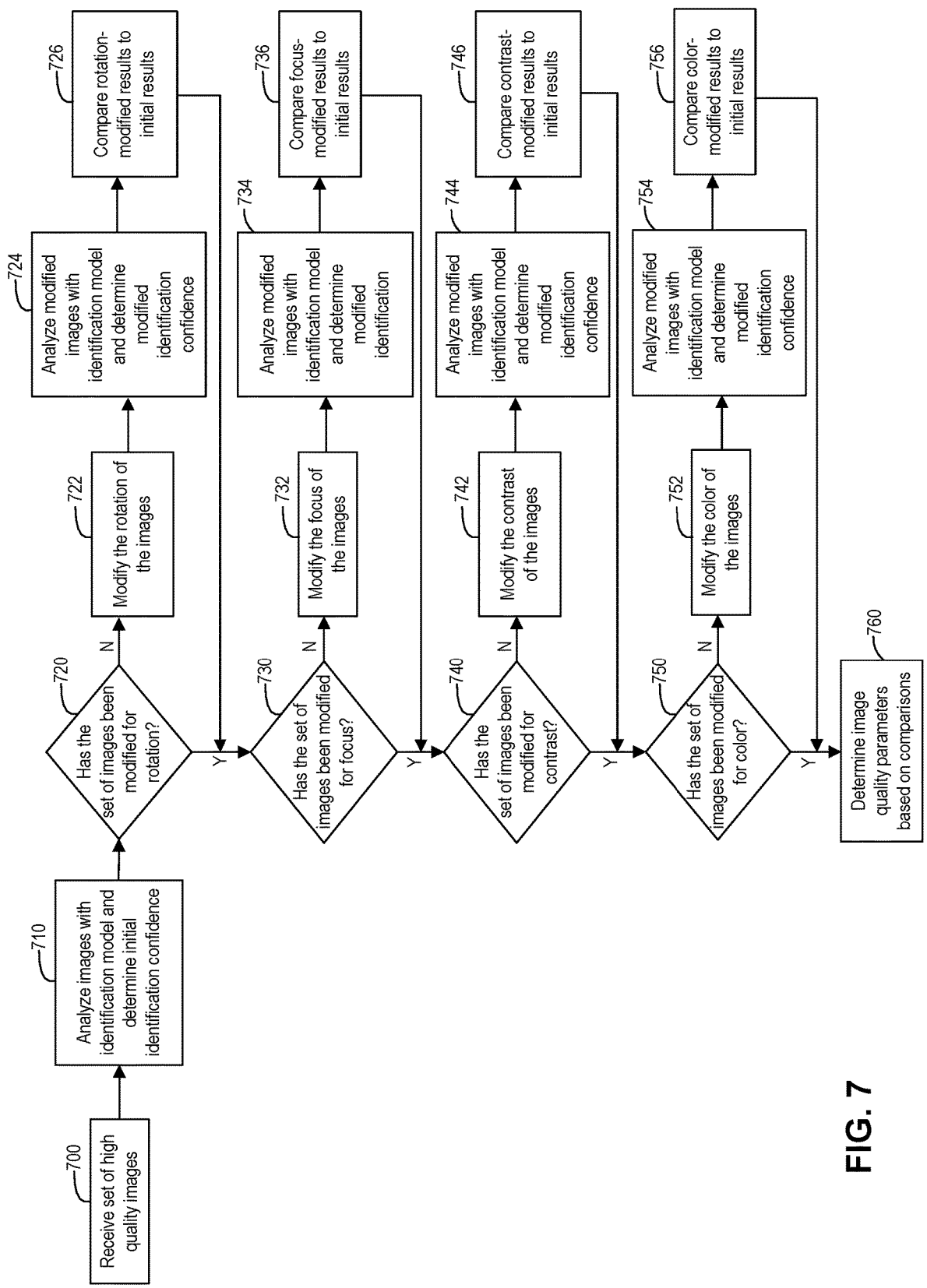
FIG. 7 is a flowchart of an exemplary method for stress testing an identification model.

FIG. 7 is a flowchart of an exemplary method for system 100 to stress test identification model. At step 700, system 100 receives a set of high-quality images of objects of the type that the system will use to identify the object. As discussed herein, system 100 may receive these from user device 110, customer device 120, and/or database 140, for example, via network 130. The received images may have associated image attributes discussed in FIGS. 3-6 as well as non-image attribute data such as object attribute data discussed above. Further, the received images may have data associated with the device capturing the image (e.g., camera type, lens type, device location, etc.). The received image attribute data may be in the form of pixel data. The images may be high quality such that the user 112 and/or customer 122 understand the received images accurately represent objects for identification.

At step 710, system 100 analyzes the received images with an identification model. That is, system 100 determines an initial identification confidence value, by recognizing features in received images portraying an object, and utilizing statistical analysis to determine an initial identification of the object through assignment of confidence index values. System 100 concludes the identity of an object based on the highest assigned confidence index value. The identification model may be any model discussed herein to identify objects in received images. In some embodiments, identification model may be used to identify vehicles as discussed in FIG. 3. Additionally, the identification model may identify the object in the received images and determine an initial confidence in that identification in accordance with the modeling and statistical analysis described above.

At step 720, system 100 further determines whether received images have been modified for rotation. System 100 may analyze received high-quality images and search for image attribute rotation modification from either system 100 or the providing device such as user device 110, customer device 120, or database 140. In some embodiments, if system 100 did not modify the rotation image attribute then the system may proceed to step 722, otherwise system 100 moves to step 730. At step 722, system 100 may modify the rotation attribute of the high quality received images by means discussed in FIGS. 5A-C. Then at step 724, system 100 may analyze the collection of modified images with the identification model and determine a new identification confidence. System 100 may modify the high quality received image numerous times, much like illustrated in FIGS. 5A-C, and system 100 at step 724 will determine a respective modification identification confidence for each identification for each modified image. Then at step 726, system 100 may compare the image attribute modification confidence results to the initial identification confidence to further determine how the series of rotation modifications effect the initial identification confidence for that particular received high quality image. Then the system may proceed to step 730.

At step 730, system 100 further determines whether received high quality images have been modified for focus. Like step 720, system 100 may analyze received high quality images from user device 110, customer device 120, database 140, and/or modified images from step 720. In some embodiments, if system 100 did not modify the focus image attribute, then the system may proceed to step 732, otherwise system 100 may move to step 740. At step 732, much like step 722, system 100 may modify the focus attribute of the high quality received images by similar means discussed in FIGS. 5A-C. Then at step 734, system may analyze the collection of modified images with the identification model and determine a new identification confidence. System 100 may modify the high quality received image numerous times for focus, much like rotation illustrated in FIGS. 5A-C, and system 100 at step 734 will determine a respective modified identification confidence for each image with a focus modification. Then at step 736, system 100 may compare the focus image attribute modification confidence results to the initial identification confidence to further determine how the series of focus modifications effect the initial identification confidence for that particular received high quality image. Then the system may proceed to step 740.

At step 740, system 100 further determines whether received high quality images have been modified for contrast. Like steps 720 and 730, system 100 may analyze received high quality images from user device 110, customer device 120, database 140, and/or modified images from steps 720 and 730. In some embodiments, if system 100 did not modify the contrast image attribute, then the system may proceed to step 742, otherwise system 100 may move to step 750. At step 744, much like steps 722 and 732, system 100 may modify the contrast attribute of the high quality received images by similar means discussed in FIGS. 5A-C. Then at step 744, system may analyze the collection of contrast-modified images with the identification model and determine a new identification confidence. System 100 may modify the high quality received image numerous times for contrast, much like rotation illustrated in FIGS. 5A-C, and system 100 at step 744 will determine a respective modified identification confidence for each image with a contrast modification. Then at step 746, system 100 may compare the contrast image attribute modification confidence results to the initial identification confidence to further determine how the series of contrast modifications effect the initial identification confidence for that particular received high quality image. Then the system may proceed to step 750.

At step 750, system 100 further determines whether received high quality images have been modified for color. Like steps 720, 730, and 740, system 100 may analyze received high quality images from user device 110, customer device 120, database 140, and/or modified images from steps 720, 730, and 740. In some embodiments, if system 100 did not modify the color image attribute, then the system may proceed to step 752, otherwise system 100 may move to step 760. At step 754, much like steps 722, 732, and 742, system 100 may modify the color attribute of the high quality received images by similar means discussed in FIGS. 5A-C. Then at step 754, system may analyze the collection of color-modified images with the identification model and determine a new identification confidence for this set. System 100 may modify the high quality received image numerous times for color, much like rotation illustrated in FIGS. 5A-C, and system 100 at step 754 will determine a respective modified identification confidence for each image with a color modification. Then at step 756, system 100 may compare the color image attribute modification confidence results to the initial identification confidence to further determine how the series of color modifications effect the initial identification confidence for that particular received high quality image. Then the system may proceed to step 760.

It will be understood by one skilled in the art that while FIG. 7 only depicts steps for rotation, focus, contrast, and color attributes, that similar modification, analysis, and comparison steps may be done for additional image attributes to further stress test the identification model.

At step 760, system 100 may determine a set of quality control parameters based on the comparisons from steps 726, 736, 746, and 756. In some embodiments, system 100 may recognize that certain modifications significantly alter the identification confidence, as noted by a significant difference between the initial identification confidence from step 710 and the new modified confidences. System 100 may use this information to create respective quality control parameters that further dictate which image attributes are affected by respective attribute modification, and how significantly.

Additionally, in some embodiments, system 100 may stress test the identification model for multiple objects, such as several vehicles, and determine the resulting identification confidences for image attribute modification of each respective vehicle. System 100 may determine a distribution of identification confidences for a given vehicle and a set of image attribute modifications.

Alternatively, system 100 may further recognize effects on the identification confidences, or distribution of identification confidences, for a given image attribute modification and associate the resulting identification confidence distributions with that given image attribute modification. For instance, system 100 may recognize that the image was captured in a low-brightness (e.g. low-light) setting based solely on the resulting identification confidence distributions. This may be advantageous where user 112 only has access to the resulting identification confidence distributions but does not have access to the original identified images used by the identification model version embedded on customer device 120. User 112 may use the resulting identification confidence distributions to improve the identification model version embedded on customer device 120. The identification model may further use the resulting identification confidence distributions to recognize a low-quality image attribute, such as low-brightness, modify that image attribute, and recalculate the identification confidences. This low-light attribute may be recognized across several images, when analyzed by methods discussed in FIG. 7, such that it may be further incorporated into pre-model image preprocessing by increasing brightness by 20% for all images. Additionally, this image preprocessing may be further transmitted to identification model version embedded on customer device 120.

In some embodiments, the identification model of system 100 may assign identification confidence values to potential objects, and not conclude the identity of the object based on the resulting identification confidence values because no assigned value is above a threshold. System 100 may further use the methods discussed in FIG. 7 to recognize an image attribute for modification, and modification of that attribute may improve the resulting identification confidence values such that one value is above the threshold and system 100 concludes the identity of the object. A person skilled in the art will further understand that the resulting identification confidences and the distribution of these confidence values for image modifications may be further used to adjust the identification model threshold for given scenarios, such as consistently recognized low-brightness images.

Figure 8:
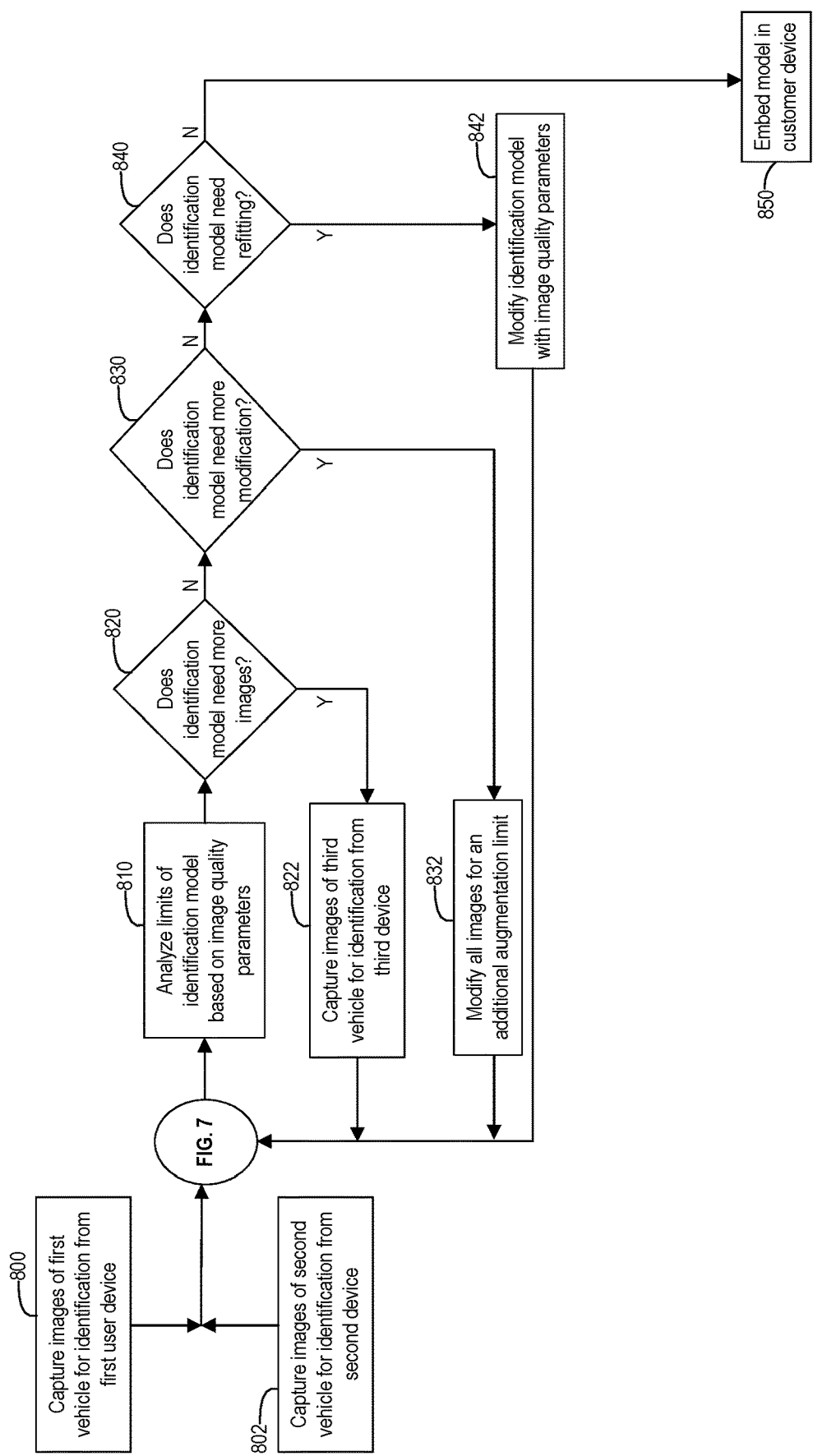
FIG. 8 is a flowchart of an exemplary method for using stress test results to modify a model.

FIG. 8 is a flowchart of an exemplary method for system 100 to stress test an identification model of a vehicle and use the stress test results to modify the model or adjust confidence thresholds.

At step 800, a first user device 110 may capture a first set of high-quality images for a first vehicle for identification. The received high quality images may include image attributes discussed in FIGS. 3-6 as well as non-image attribute data. The received image attribute data may be in the form of pixel data, the data may be relative to the image itself, or the data may be associated with the device capturing the image. Additionally, at step 802, a second user device 110 may capture a second set of images for a second vehicle for identification in the model. Alternatively, it will be further understood that the second user device 110 may capture a second set of images of the first vehicle for identification in the model. System 100 then proceeds to the steps described in FIG. 7 with both sets of images from steps 800 and 802.

At step 810, system 100 analyzes the image quality control parameters from step 760 to determine the accuracy limits of the identification model. In some embodiments, system 100 may determine that the identification model is limited by an image attribute modification such that the confidence results are consistently significantly affected by image modifications. Based on these image quality control parameters from step 760, and analysis from step 810, system 100 at step 820 determines whether the model needs more images. The additional images may be stored in database 140 for future identification model use, or the additional images may be collected for additional stress-testing from user device 110. In one embodiment, system 100 may determine at step 820 that more images are needed based on statistical results and low confidence scores. System 100 will proceed to step 822 if more images are needed, otherwise system 100 proceeds to step 830. At step 822, system 100 captures a third set of images for a third vehicle for identification with a third user device 110. Alternatively, it will be further understood that the third user device 110 may capture a third set of images of the first vehicle for identification in the model. Then system 100 repeats FIG. 7 and step 810.

At step 830, system 100 determines whether the model requires more image attribute modifications. Based on the image quality control parameters from step 760, and analysis from step 810, the system may, in some embodiments, determine that confidence level determinations may be improved with additional attribute modifications, then system 100 proceeds to step 832. Otherwise, system 100 proceeds to step 840. At step 832, system 100, much like steps 722, 724, and 726, system 100 will modify the entire set of received images with a new image attribute modification. Then system 100 repeats FIG. 7 and step 810.

At step 840, system 100 determines whether the identification model requires refitting and modification. If system 100 determines the identification model requires refitting, then it proceeds to step 842 and modifies the model in accordance with the image quality control parameters determined at step 760 (i.e. +/−5% brightness). For instance, if system 100 determines identification of a particular vehicle is only reliable within a narrow brightness image quality control parameter (i.e. +/−5% brightness modification) and requires refitting at step 840, then the model may be refit with images of the particular vehicle with greater modified brightness range (i.e. +/−30%) so that the model may learn to handle a greater brightness range at step 842. In addition, system 100 at step 842 may further associate the refitting with the particular vehicle such that identification model applies the step 760 determined image quality control parameters for only that vehicle. Then system 100 repeats FIG. 7 and step 810. Otherwise, at step 850, system 100 releases the identification model and proceeds with embedding the released model version in customer device 120.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within the skill of a software developer. The various programs or program modules can be created using a variety of programming techniques. For example, program sections or program modules can be designed by means of JavaScript, Scala, python, Java, C, C++, assembly language, or any such programming languages, as well as data encoding languages (such as XML, JSON, etc.), query languages (such as SQL), presentation-related languages (such as HTML, CSS etc.) and data transformation language (such as XSL). One or more of such software sections or modules can be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A system for stress testing a vehicle identification model, comprising:
   one or more memory devices storing instructions; and
   one or more processors configured to execute the instructions to perform operations comprising:

receiving a plurality of first training images of a known vehicle make, model and year, the plurality of images having a known prediction confidence output by the vehicle identification model;

modifying at least one attribute of the first images, the attribute comprising at least one of a rotation attribute, a focus attribute, a contrast attribute, or a color attribute;

analyzing the modified images using the model;

determining a plurality of vehicle prediction confidence values output from the model based on the modified images; and adjusting a prediction threshold associated with the model based on at least the plurality of vehicle prediction confidence values.

2. The system of claim 1, wherein modifying the at least one attribute of the first images comprises modifying values of a first one of the attributes of the first training images.

3. The system of claim 1, wherein modifying the first images further comprises modifying the rotation, focus, contrast, and color attribute values of the first training images.

4. The system of claim 3, wherein modifying the rotation attribute value of the first training images further comprises:
adjusting the respective rotation attribute value of the training images;
analyzing the modified images with the model and determining respective identification confidence values; and
comparing the determined confidence values with their respective known prediction confidence output.

5. The system of claim 3, wherein modifying the focus attribute value of the first training images further comprises:
adjusting the respective focus attribute value of the training images;
analyzing the modified images with the model and determining respective identification confidence values; and
comparing the determined confidence values with their respective known prediction confidence output.

6. The system of claim 3, wherein modifying the contrast attribute value of the first training images further comprises:
adjusting the respective contrast attribute value of the training images;
analyzing the modified images with the model and determining respective identification confidence values; and
comparing the determined confidence values with their respective known prediction confidence output.

7. The system of claim 3, wherein modifying the color attribute value of the first training images further comprises:
adjusting the respective color attribute value of the training images;
analyzing the modified images with the model and determining respective identification confidence values; and
comparing the determined confidence values with their respective known prediction confidence output.

8. The system of claim 1, wherein:
receiving further comprises receiving a plurality of second images of an unknown vehicle make, model, and year, the plurality of second images having an unknown prediction confidence output by the vehicle identification model;
modifying further comprises modifying at least one attribute of the second images, the attribute comprising at least one of a rotation attribute, a focus attribute, a contrast attribute, or a color attribute;
analyzing further comprises analyzing the modified second images using the model; and determining further comprises determining a plurality of vehicle prediction confidence values output from the model based on the modified second images.

9. The system of claim 8, further comprising analyzing the received second images with the model and determining an original plurality of vehicle prediction confidence values output from the model based on the received second images.

10. The system of claim 9, further comprising:
comparing the original confidence values with their respective determined confidence values for the second images; and
updating the model with the compared confidence values for the second images.

11. A user device, comprising:
one or more memory devices storing instructions;
an image sensor; and
one or more processors configured to execute the instructions to perform operations comprising:
collecting, with the image sensor, a plurality of first images of a vehicle, the first images having attributes with preset values, the attributes comprising at least one of a rotation attribute, a focus attribute, a contrast attribute, or a color attribute;
analyzing the images using a vehicle identification application, the application comprising a vehicle identification model that includes a prediction threshold associated with the model;
determining, with the application, a first identification confidence value of the vehicle based on the first images;
sending, to a processing device, the first identification confidence value;
receiving an update to the model from the processing device, wherein the updated model includes an adjusted prediction threshold;
analyzing the first images using the vehicle identification application comprising the updated vehicle identification model;
determining, with the application comprising the updated model, a second identification confidence value of the vehicle based on the first images; and
comparing the first identification confidence value with the second identification confidence value.

12. The device of claim 11, wherein the one or more processors are further configured to determine whether the update to the model from the processing device improved the model based on the compared first and second identification confidence values.

13. The device of claim 11, wherein the one or more processors are further configured to send, to the processing device, the second identification confidence value.

14. The device of claim 13, wherein the one or more processors are further configured to perform operations comprising:
collecting, with the image sensor, a plurality of second images of a vehicle, the second images having attributes with preset values, the attributes comprising at least one of a rotation attribute, a focus attribute, a contrast attribute, or a color attribute;
analyzing the second images using the vehicle identification application;
determining, with the application, a first identification confidence value of the vehicle based on the second images;
sending, to the processing device, the first identification confidence value based on the second images;

receiving a second update to the model from the processing device;

analyzing the second images using the vehicle identification application comprising the second updated vehicle identification model;

determining, with the application comprising the second updated model, a second identification confidence value of the vehicle based on the second images;

comparing the first identification confidence value with the second identification confidence value based on the second images; and sending, to the processing device, the second identification confidence value based on the second images.

15. The device of claim 14, wherein analyzing the second images further comprises modifying the second images.

16. The device of claim 15, wherein modifying the second images comprises altering at least one attribute of the second images, the attribute comprising at least one of a rotation attribute, a focus attribute, a contrast attribute, or a color attribute.

17. The device of claim 11, wherein the image sensor comprises of at least one of a camera, or an ambient light sensor.

18. The device of claim 11, wherein analyzing the first images using the application comprising the updated model further comprises modifying the first images.

19. The device of claim 18, wherein modifying the first images comprises altering at least one attribute of the first images, the attribute comprising at least one of a rotation attribute, a focus attribute, a contrast attribute, or a color attribute.

* * * * *

UNITED STATES PATENT AND TRADEMARK OFFICE
CERTIFICATE OF CORRECTION

PATENT NO. : 11,087,447 B2  
APPLICATION NO. : 16/411808  
DATED : August 10, 2021  
INVENTOR(S) : Micah Price et al.

Page 1 of 1

It is certified that error appears in the above-identified patent and that said Letters Patent is hereby corrected as shown below:

In the Claims

In Claim 11, Column 18, Line 37, "analyzing the first images" should read --analyzing the images--.

In Claim 11, Column 18, Line 42, "based on the first images;" should read --based on the images;--.

In Claim 18, Column 19, Lines 24-25, "analyzing the first images" should read --analyzing the images--.

In Claim 18, Column 19, Line 26, "modifying the first images." should read --modifying the images.--.

In Claim 19, Column 19, Lines 27-28, "modifying the first images" should read --modifying the images--.

In Claim 19, Column 19, Lines 28-29, "attribute of the first images," should read --attribute of the images,--.

Signed and Sealed this  
Ninth Day of November, 2021

Drew Hirshfeld  
*Performing the Functions and Duties of the  
Under Secretary of Commerce for Intellectual Property and  
Director of the United States Patent and Trademark Office*